United States Patent
Andrews

(10) Patent No.: US 7,030,887 B2
(45) Date of Patent: Apr. 18, 2006

(54) METHODS AND SYSTEMS FOR TRANSPARENT DEPTH SORTING

(75) Inventor: Jeffrey A. Andrews, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 167 days.

(21) Appl. No.: 10/706,690

(22) Filed: Nov. 12, 2003

(65) Prior Publication Data

US 2005/0057574 A1 Mar. 17, 2005

Related U.S. Application Data

(63) Continuation-in-part of application No. 10/661,343, filed on Sep. 12, 2003, now abandoned.

(51) Int. Cl.
G09G 5/339 (2006.01)
G09G 5/02 (2006.01)
G06T 17/20 (2006.01)
G06T 15/50 (2006.01)

(52) U.S. Cl. .............. 345/592; 345/422; 345/426; 345/539; 345/561

(58) Field of Classification Search ........ 345/418–422, 345/426, 589, 592, 552–553, 428, 586, 588, 345/574, 536–539, 545–546, 561–563
See application file for complete search history.

(56) References Cited

U.S. PATENT DOCUMENTS

| 5,949,428 | A | 9/1999 | Toelle et al. |
|---|---|---|---|
| 6,326,964 | B1 | 12/2001 | Snyder et al. |
| 6,384,824 | B1 | 5/2002 | Morgan et al. |
| 6,417,858 | B1 | 7/2002 | Bosch et al. |
| 6,466,223 | B1 | 10/2002 | Dorbie et al. |
| 6,476,807 | B1 * | 11/2002 | Duluk et al. ............ 345/421 |
| 6,480,205 | B1 | 11/2002 | Greene et al. |
| 6,498,606 | B1 | 12/2002 | Penna et al. |
| 6,614,441 | B1 * | 9/2003 | Jiang et al. ............ 345/539 |

OTHER PUBLICATIONS

Yamachi, et al.;"The Technique for Object and Collision Detection by Z-buffer"; Department of Computer and Information Engineering; Nippon Institute of TEchnology; vol. 43; No. 6; Jun. 2002; pp. 1899-1911.

White, et al; The Tayra 3-D Graphics Raster Processor; Comput. & Graphics, vol. 21; No. 2; pp. 129-142; 1997.

(Continued)

Primary Examiner—Matthew C. Bella
Assistant Examiner—Sajous Wesner
(74) Attorney, Agent, or Firm—Lee & Hayes, PLLC

(57) ABSTRACT

Methods and systems for transparent depth sorting are described. In accordance with one embodiment, multiple depth buffers are utilized to sort depth data associated with multiple transparent pixels that overlie one another. The sorting of the depth data enables identification of an individual transparent pixel that lies closest to an associated opaque pixel. With the closest individual transparent pixel being identified, the transparency effect of the identified pixel relative to the associated opaque pixel is computed. If additional overlying transparent pixels remain, a next closest transparent pixel relative to the opaque pixel is identified and for the next closest pixel, the transparency effect is computed relative to the transparency effect that was just computed.

44 Claims, 6 Drawing Sheets

OTHER PUBLICATIONS

Bresenham; "Teaching the graphics processing pipeline: cosmetic and geometric attribute implications"; Computers & Graphics 25 (2001) 343-349; 7pages.

Doctor, et al; "Using raster scan in color graphics"; Mini-Micro Systems; Dec. 1981; pp. 101-108.

Whitted; "Hardware Enhanced 3-D Raster Display System"; CMCCS '81/ACCHO '81; pp. 349-356.

Fuchs et al; "Pixel-Planes: A VLSI-Oriented Design For 3-D Raster Graphics"; CMCCS '81/ACCHO'81; pp. 343-347.

Parke; "Simulation and Expected Performance Analysis of Multiple Processor Z-Buffer Systems"; 1980 ACM 0-89791-021-4/80/0700-0048; pp. 48-56.

Chen et al.; "Reduce the Memory Bandwidth of 3D Graphics Hardware With a Novel Rasterizer"; Journal of Circuits, Systems, and Computers, vol. 11; No. 4; (2002) pp. 377-391.

* cited by examiner

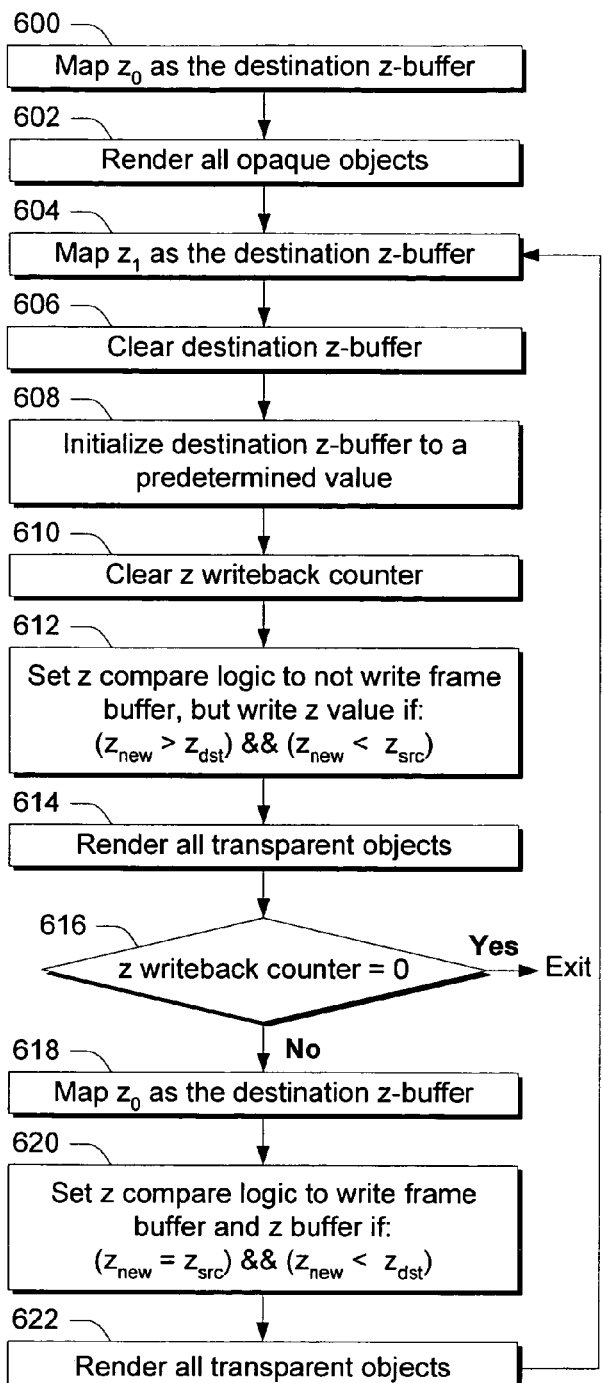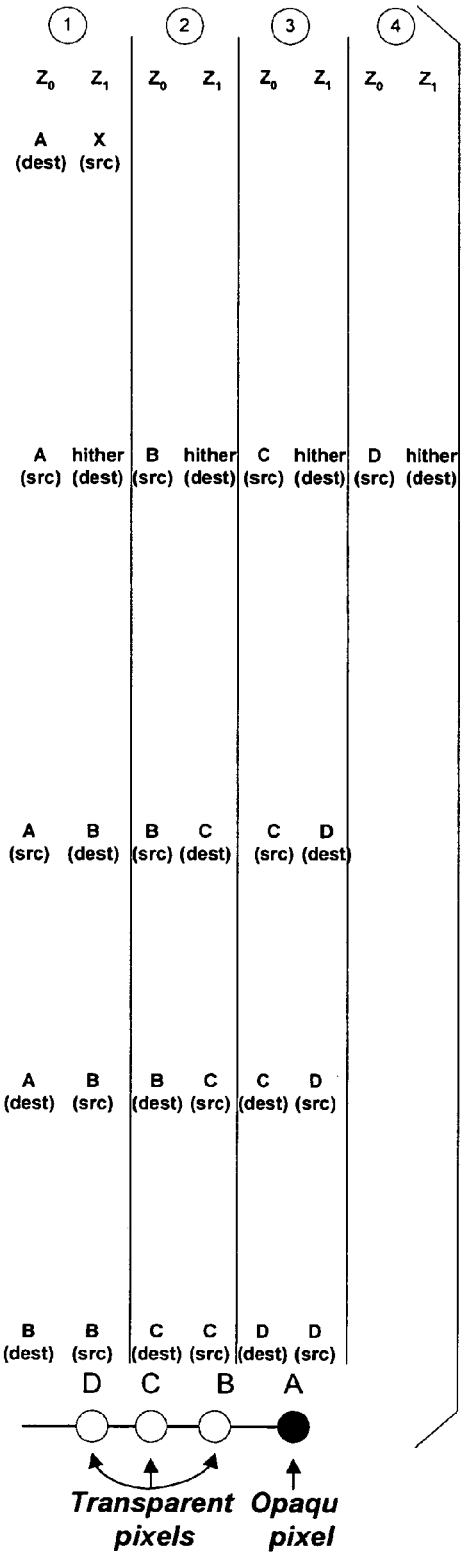
Fig. 6

METHODS AND SYSTEMS FOR TRANSPARENT DEPTH SORTING

RELATED APPLICATION

This application is a continuation-in-part of, and claims priority to U.S. patent application Ser. No. 10/661,343, filed on Sep. 12, 2003 now abandoned, the disclosure of which is incorporated by reference.

TECHNICAL FIELD

This invention relates to the field of computer graphics. More specifically, the present invention pertains to methods and systems for rendering objects.

BACKGROUND

Computer graphics systems typically utilize instructions, implemented via a graphics program on a computer system, to specify calculations and operations needed to produce two-dimensional or three-dimensional displays. Exemplary graphics systems that include APIs that are commercially available for rendering three-dimensional graphs include Direct3D, available from Microsoft Corporation, of Redmond, Wash., and OpenGL by Silicon Graphics, Inc., of Mountain View, Calif.

Computer graphics systems can be envisioned as a pipeline through which data pass, where the data are used to define an image that is to be produced and displayed. At various points along the pipeline, various calculations and operations that are specified by a graphics designer are used to operate upon and modify the data.

In the initial stages of the pipeline, the desired image is described by the application using geometric shapes such as lines and polygons, referred to in the art as "geometric primitives." The derivation of the vertices for an image and the manipulation of the vertices to provide animation entail performing numerous geometric calculations in order to eventually project the three-dimensional world being synthesized to a position in the two-dimensional world of the display screen.

Primitives are constructed out of "fragments." These fragments have attributes calculated, such as color and depth. In order to enhance the quality of the image, effects such as lighting, fog, and shading are added, and anti-aliasing and blending functions are used to give the image a more realistic appearance. The processes pertaining to per fragment calculation of colors, depth, texturing, lighting, etc., are collectively known as "rasterization".

The fragments and their associated attributes are stored in a frame buffer. Once rasterization of the entire frame has been completed, pixel color values can then be read from the frame buffer and used to draw images on the computer screen.

To assist in understanding a typical computer graphics system, consider FIG. 1 which illustrates, generally at 100, a system that can implement a computer graphics process. System 100 comprises a graphics front end 102, a geometry engine 104, a rasterization engine 106, and a frame buffer 108. System 100 can typically be implemented in hardware, software, firmware or combinations thereof, and is also referred to as a "rendering pipeline".

Graphics front end 102 comprises, in this example, an application, primitive data generation stage 102a and display list generation stage 102b. The graphics front end generates geographic primitive data consumed by the subsequent pipeline stage(s). Geographic primitive data is typically loaded from a computer system's memory and saved in a display list in the display list stage 102b. All geometric primitives are eventually described by vertices or points.

Geometry engine 104 comprises, in this example, high order surface (HOS) tessellation 104a, and per-vertex operations stage 104b. In stage 104a, primitive data is converted into simple rasterizer-supported primitives (typically triangles) that represent the surfaces that are to be graphically displayed. Some vertex data (for example, spatial coordinates) are transformed by four-by-four floating point matrices to project the spatial coordinates from a position in the three-dimensional world to a position on the display screen. In addition, certain other advanced features can also be performed by this stage. Texturing coordinates may be generated and transformed. Lighting calculations can be performed using the vertex, the surface normal, material properties, and other light information to it produce a color value. Perspective division, which is used to make distant objects appear smaller than closer objects in the display, can also occur in per-vertex operations stage 104b.

Rasterization engine 106 is configured to perform so-called rasterization of the re-assembled rasterizer-supported primitives. It comprises the following stages: triangle/point assembly 106a, setup 106b, parametric evaluation 106c, depth and stencil operations stage 106d, per-fragment operations stage 106e, and the blend and raster operations (ROP) stage 106f.

Rasterization refers to the conversion of vertex data connected as rasterizer-supported primitives into "fragments." Each fragment corresponds to a single element (e.g., a "pixel" or "sub-pixel") in the graphics display, and typically includes data defining color, transparency, depth, and texture(s). Thus, for a single fragment, there are typically multiple pieces of data defining that fragment. To perform its functions, triangle/point assembly stage 106a fetches different vertex components, such as one or multiple texture component(s), a color component, a depth component, and an alpha blending component (which typically represents transparency).

Setup stage 106b converts the vertex data into parametric function coefficients that can then be evaluated on a fragment coordinate (either pixel or sub-pixel) by fragment coordinate basis. Parametric evaluation stage 106c evaluates the parametric functions for all the fragments which lie within the given rasterizable primitive, while conforming to rasterizable primitive inclusion rules and contained within the frame buffer extents.

Depth and stencil operations stage 106d perform depth operations on the projected fragment depth and application specified fragment stencil operations. These operations apply to both the comparison function on the depth and stencil values, how the depth and stencil values should be updated in the depth/stencil buffer and whether the fragment should terminate or continue processing. In the idealized rasterization pipeline these operations take place just before frame buffer write-back (after blend and ROP stage 106f), but commonly these operations are valid before the per-fragment operations stage 106e, which enables early termination of many fragments and corresponding performance optimizations/improvements.

Per-fragment operations stage 106e typically performs additional operations that may be enabled to enhance the detail or lighting effects of the fragments, such as texturing, bump mapping, per-fragment lighting, fogging, and other like operations. Near the end of the rasterization pipeline is the blend and raster operation (ROP) stage 106f, which implements blending for transparency effects and traditional 2D blit raster operations. After completion of these operations, the processing of the fragment is complete and it is typically written to frame buffer 110 and potentially to the depth/stencil buffer 108. Thus, there are typically multiple pieces of data defining each pixel.

Now consider so-called "depth sorting" as it pertains to rendering 3D graphics. Depth sorting in computer graphics is typically accomplished using what is referred to as a "depth buffer". A depth buffer, often implemented as a "z-buffer" or a "w-buffer", is a 2D memory array used by a graphics device that stores depth information to be accessed by the graphics device while rendering a scene. Typically, when a graphics device renders a 3D scene to a render surface, it can use the memory in an associated depth buffer surface as a workspace to determine how the pixels or sub-pixels of rasterized polygons occlude one another. The render surface typically comprises the surface or buffer to which final color values are written. The depth buffer surface that is associated with the render target surface is used to store depth information that tells the graphics device how deep each visible pixel or sub-pixel is in the scene.

When a 3D scene is rasterized in a rasterization pipeline with depth buffering enabled, each point on the rendering surface is typically tested. A depth buffer that uses z values is often called a z-buffer, and one that uses w values is called a w-buffer. Implementations may alternatively user other depth values such as 1/z or 1/w. While these invert the sense of increasing values with increasing depth, this fact is typically hidden from the application and can therefore just be thought of as a simple z or w buffer.

At the beginning of rendering a scene to a render target surface, the depth value in the depth buffer is typically set to the largest possible value for the scene. The color value on the rendering surface is set to either the background color value or the color values of the background texture at that point. Once a fragment has been generated at a given coordinate (x,y) on the rendering surface, the depth value—which will be, for example, the z coordinate in a z-buffer, and the w coordinate in a w-buffer—at the current coordinate is tested to see if it is smaller than the depth value stored in the depth buffer. If the depth value of the polygon is smaller, it is stored in the depth buffer and the color value from the polygon is written to the current coordinate on the rendering surface. If the depth value of the polygon at that coordinate is larger, the fragment is terminated, so the depth buffer retains the smallest value at the current coordinate. This process is shown for opaque polygons diagrammatically in FIG. 2.

There, notice that two polygons 200, 202 overlap along a ray that is associated with a current coordinate 204 of interest. When the 3D scene is rasterized, each coordinate on the rendering surface is typically tested. Here, the corresponding location in depth buffer 206 corresponding to pixel (or sub-pixel) 204 is set to the largest possible value for the scene. The color value on the rendering surface for this location can be set to a background color. Polygons 200 and 202 are effectively tested during rasterization to ascertain whether they intersect with the current coordinate on the rendering surface. Since both polygons intersect with the current coordinate on the rendering surface, the depth value of polygon 200 at the current coordinate is effectively tested to see whether it is smaller than the value at the current coordinate in the depth buffer. Here, since the depth value of the polygon 200 for the associated coordinate is smaller than the current depth value, the depth value for polygon 200 at the current coordinate is written to the depth buffer and the color value for the polygon at the current coordinate is written to the corresponding location in the rendering surface (also referred to as the color buffer). Next, with the depth buffer holding the depth value for polygon 200 at the current coordinate, the depth value of polygon 202 at the current coordinate is tested against the current depth value in the depth buffer. Since the depth value of polygon 202 at the current coordinate is smaller than the depth value of polygon 200 at the current coordinate, the depth value of polygon 202 at the current coordinate is written to the corresponding depth buffer location and the color value for polygon 202 at the current coordinate is written to the corresponding location on the rendering surface.

In this manner, in the ultimately rendered image, overlapping portions of polygon 202 at the current coordinate will occlude underlying portions of polygon 200 at the current coordinate.

Now consider what is a fundamental problem in 3D graphics—that which is referred to as transparent depth sorting.

To appreciate this problem, consider that there are typically two different types of pixels—opaque pixels and transparent pixels. Opaque pixels are those pixels that pass no light from behind. Transparent pixels are those pixels that do pass some degree of light from behind.

Consider now FIG. 3 which shows a viewer looking at a scene through one exemplary pixel 300 on a screen. When an object is rendered by a 3D graphics system, if the object is to appear as a realistic representation of what a viewer would see in the real world, then this pixel should represent all of the light contributions, reflected back towards the viewer, that lie along a ray R. In this example, ray R intersects three different objects—an opaque mountain 302, a first transparent object 304 and a second transparent object 306. The nearest opaque pixel to the viewer is pixel 302a which lies on the mountain. Because this pixel is opaque, no other pixels that might be disposed behind this pixel on the mountain will make a contribution to the ultimately rendered pixel.

In the real world, transparent objects 304, 306 cause the light that is reflected back towards the viewer to be affected in some way. That is, assume that objects 304, 306 are glass or windows that have some type of coloration and applied lighting and/or environmental effects. The effect of these windows is to slightly dim or otherwise attenuate the light that is associated with pixel 302a then apply lighting and/or environmental effects. In the real world, the viewer's eye effectively sums all of the light contributions to provide a realistic image of the distant mountain. In the 3D graphics world, this is not an easy.

Specifically, assume that pixel 302a has associated color values that describe how that pixel is to be rendered without any transparency effects applied. The influence of the right side of object 304 at 304a, and the left side of object 304 at 304b, with applied lighting 308, will change the color values of the associated is pixel. Similarly, the influence of the right side of object 306 at 306a, and the left side at 306b, with applied lighting 310, will further change the color values of the associated pixel.

Thus, if one wishes to accurately render pixel 302a, one should necessarily take into account the transparency and lighting effects of these lighted transparent objects, which requires back to front drawing ordering of the transparent objects' contributions to the given pixel.

The traditional depth buffering techniques described above do nothing to alleviate the back to front rendering order problem. Specifically, the traditional depth buffering techniques essentially locate the closest pixel (i.e. the pixel with the smallest z value) and then write the pixel's color values to the color buffer. There is no back to front ordering, with partial application of the overlying pixel's color values (and inversely partial retaining of the current color value). Thus, traditional depth buffering techniques do not take into account this transparency issue.

There have been attempts in the past to solve this particular transparency depth sorting issue. For example, one solution to this problem is to push the problem onto the application programmer. For example, the application programmer might resolve this issue by drawing all of the opaque objects first, and then perform some type of inexpensive bounding box or bounding sphere processing, and present the resulting data to a graphics engine in back-to-front order. This can unnecessarily burden the application programmer.

Another general scheme to attempt to solve the transparency depth sorting problem is known as the "A-buffer" approach. This approach creates a per pixel linked list of all of the pieces of per pixel data as a frame is being drawn. For every pixel in the frame buffer, there is a linked list of fragments. These fragments embody the contributions of the various objects at the given coordinate that are in the scene. The A-buffer approach is a very general method that essentially collects all of the linked list data for each pixel, and after all of linked list data is collected, resolves the back to front issues, on a pixel by pixel basis, after the scene is completely drawn. In the context of a resource-rich environment where time is not a factor, this approach is acceptable as the software program simply operates on the data as the data is provided to it.

One problem with the A-buffer approach, however, is most easily appreciated in environments that are not necessarily resource-rich, and where time is, in fact, a factor, e.g. the gaming environment where it is desirable to render real time 3D graphics. With the A-buffer approach, the size of the linked lists and all of the data in the linked lists can be quite large. Today, it is not economical to have a frame buffer that is so large as to support the size of the linked lists. While the results that are produced using the A-buffer approach are nice, the costs associated with attaining such results are not appropriate for the real time environment.

Accordingly, this invention arose out of concerns associated with providing improved graphics systems and methods.

SUMMARY

Methods and systems for transparent depth sorting are described. In accordance with one embodiment, multiple depth buffers are utilized to sort depth data associated with multiple transparent pixels that overlie one another in back to front order. The sorting of the depth data enables identification of an individual transparent pixel that lies closest to an associated opaque pixel. With the closest individual transparent pixel being identified, the transparency effect of the identified pixel relative to the associated opaque pixel is computed. If additional overlying transparent pixels remain, a next closest transparent pixel relative to the opaque pixel is identified and, for the next closest pixel, the transparency effect is computed relative to the transparency effect that was just computed. This process iterates until there are no remaining overlying pixels in any transparent objects being rasterized.

BRIEF DESCRIPTION OF THE DRAWINGS

FIG. 6 is a flow diagram and graphic that illustrates steps in a method in accordance with one embodiment.

DETAILED DESCRIPTION

Overview

Figure 1:
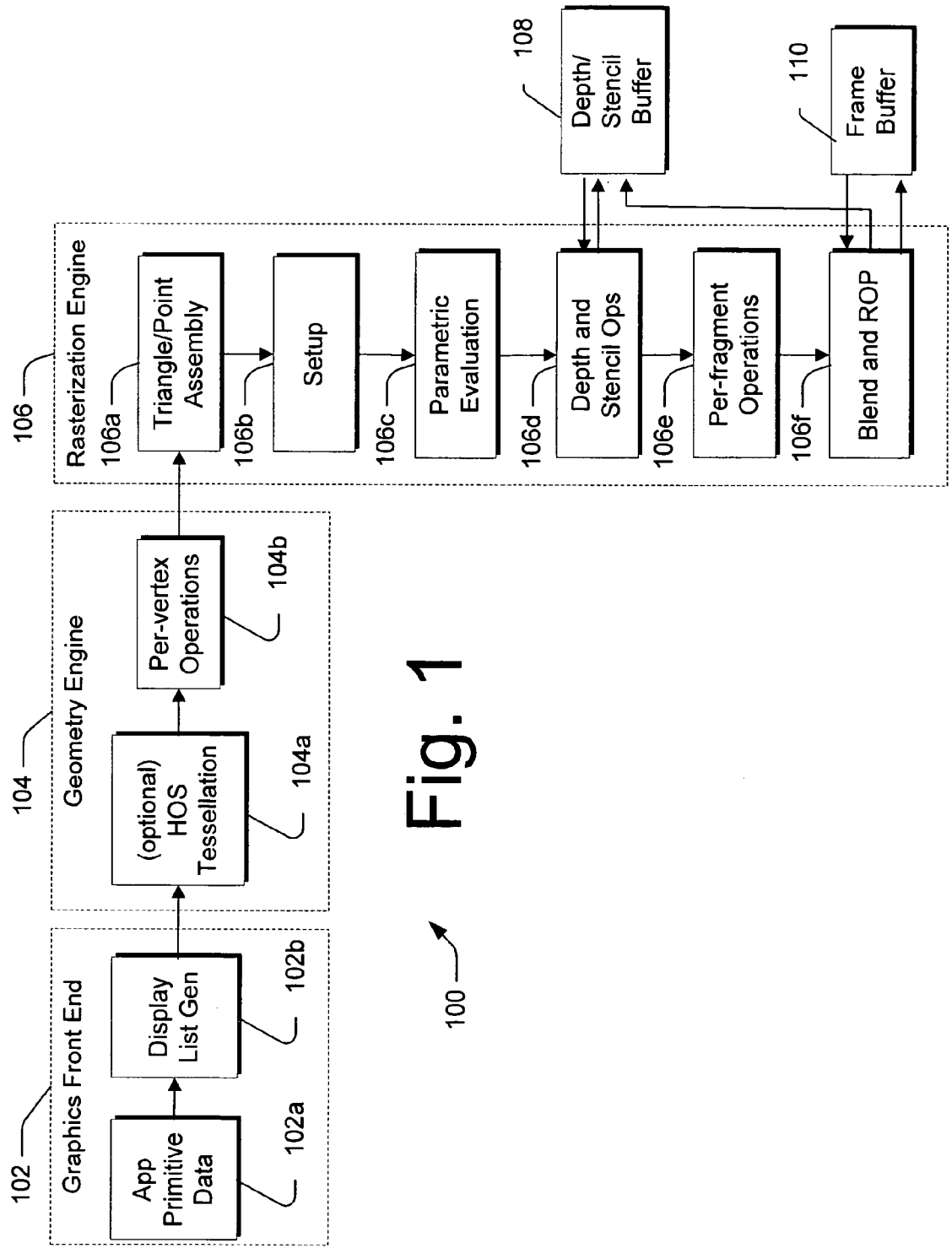
FIG. 1 is a block diagram that illustrates one type of computer graphics system.
Figure 2:
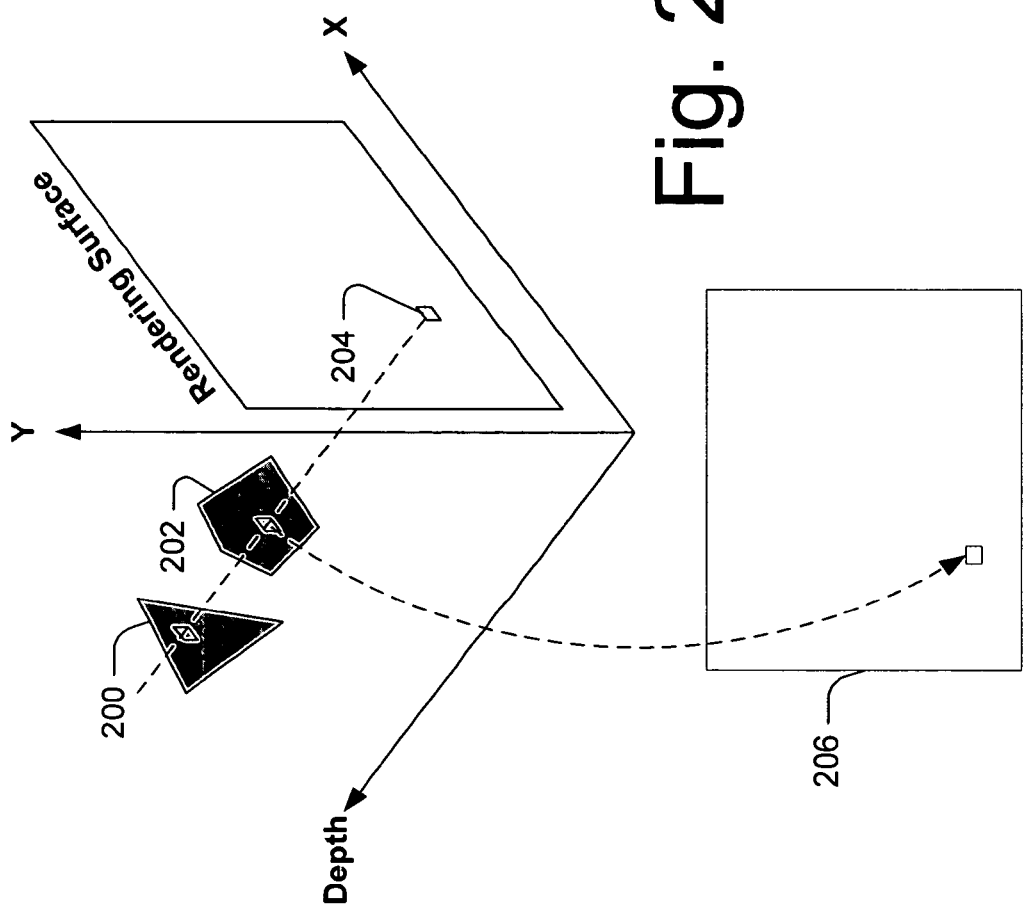
FIG. 2 is a diagram that illustrates a depth sorting process that utilizes a depth buffer.
Figure 3:
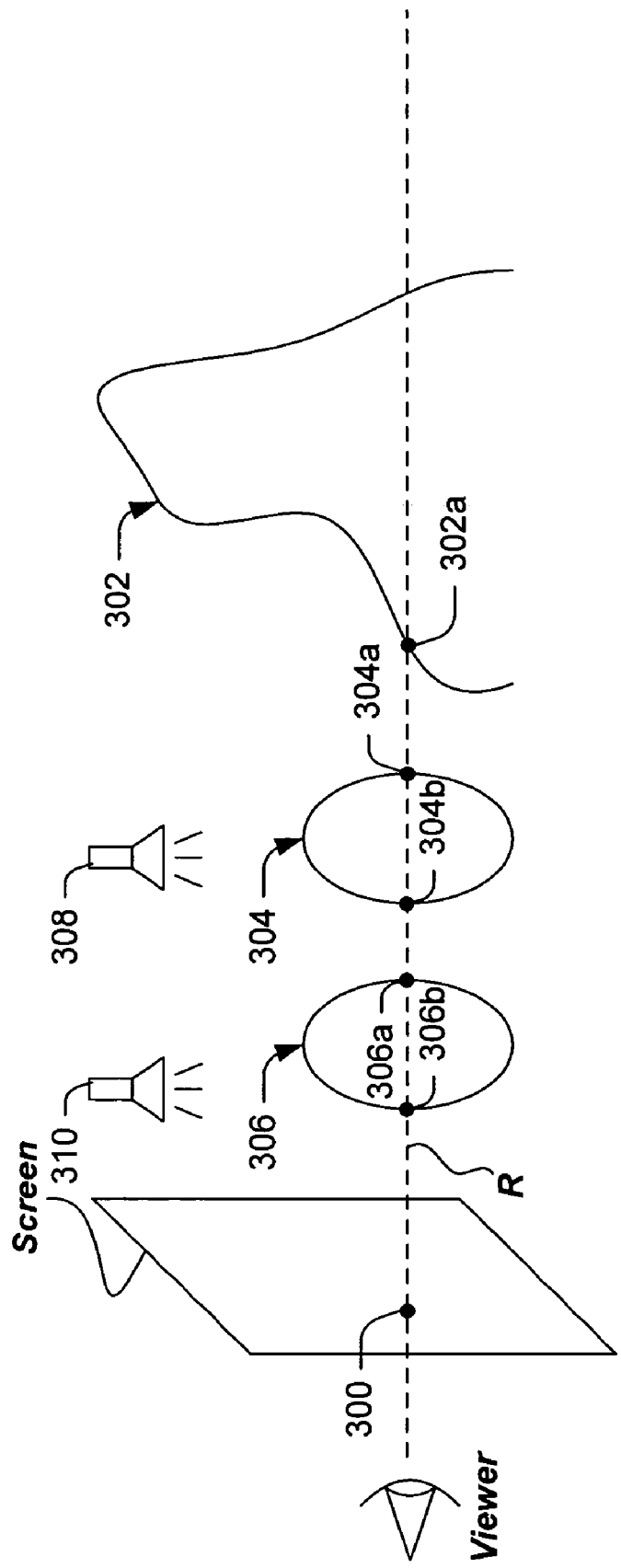
FIG. 3 is a diagram that illustrates aspects of a computer graphics scenario in which multiple transparent objects are employed.

Reference will now be made in detail to exemplary embodiments, examples of which are illustrated in the accompanying drawings. The described embodiments are not intended to limit application of the claimed subject matter to only the specific embodiments described. On the contrary, the claimed subject matter is intended to cover alternatives, modifications and equivalents, which may be included within the spirit and scope of various features of the described embodiments.

Furthermore, in the following detailed description, numerous specific details are set forth in order to provide a thorough understanding of the described embodiments. It is quite possible, however, for the various embodiments to be practiced without these specific details, but with details that are different, but still within the spirit of the claimed subject matter. In some instances, well-known methods, procedures, components, and circuits that are ancillary to, but support the claimed embodiments have not been described in detail so as not to unnecessarily obscure aspects of the embodiments that are described.

Some portions of the detailed descriptions which follow are presented in terms of procedures, logic blocks, processing, and other symbolic representations of operations on data bits within a computer memory or cache. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, pixel data, or the like.

In the discussion that follows, terms such as "processing," "operating," "calculating," "determining," "displaying," or the like, refer to actions and processes of a computer system or similar electronic computing device. The computer system or similar electronic computing device manipulates and transforms data represented as physical (electronic) quantities within the computer system memories, registers or other such information storage, transmission or display devices.

The embodiments described below pertain to a graphics subsystem that is programmed or programmable to operate upon geometric primitive data that is to be ultimately rendered to some type of display device. This graphics subsystem can comprise an entire graphics engine, including a transform engine for geometry calculations, a raster component comprising one or more of texture components, specular components, fog components, and alpha blending components, and any other components that can process application submitted and subsequent intermediate graphics data. In some embodiments, the graphics subsystem can be embodied in an integrated circuit component.

Exemplary System

Figure 4:
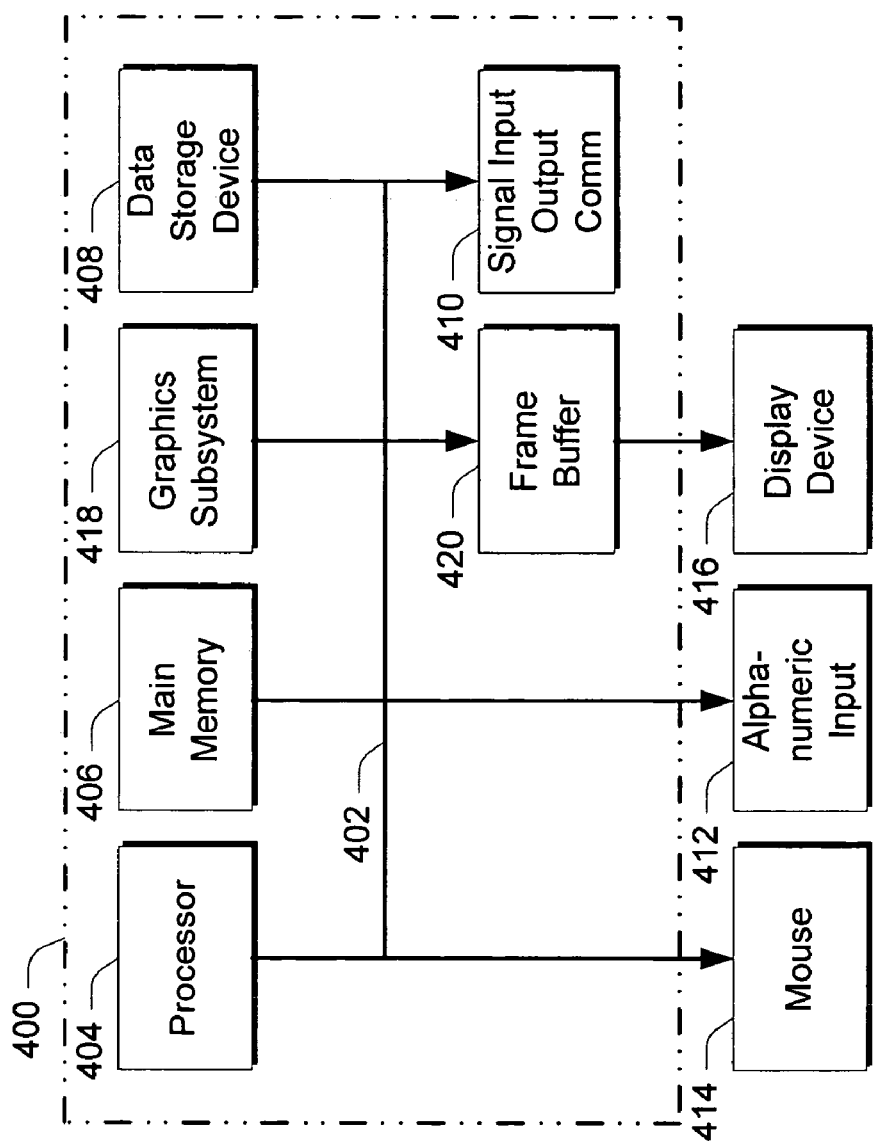
FIG. 4 illustrates an exemplary system that can be utilized to implement the various embodiments described herein.

FIG. 4 illustrates an exemplary system 400 that can be utilized to implement one or more of the embodiments described below. This system is provided for exemplary purposes only and is not intended to limit application of the claimed subject matter.

System 400 exemplifies a computer-controlled, graphics system for generating complex or three-dimensional images. Computer system 400 comprises a bus or other communication means 402 for communicating information, and a processor 404 coupled with bus 402 for processing information. Computer system 400 further comprises a random access memory (RAM) or other dynamic storage device 406 (e.g. main memory) coupled to bus 402 for storing information and instructions to be executed by processor 404. Main memory 406 also may be used for storing temporary variables or other intermediate information during execution of instructions by processor 404. A data storage device 408 is coupled to bus 402 and is used for storing information and instructions. Furthermore, signal input/output (I/O) communication device 410 can be used to couple computer system 400 onto, for example, a network.

Computer system 400 can also be coupled via bus 402 to an alphanumeric input device 412, including alphanumeric and other keys, which is used for communicating information and command selections to processor 404. Another type of user input device is mouse 414 (or a like device such as a trackball or cursor direction keys) which is used for communicating direction information and command selections to processor 404, and for controlling cursor movement on a display device 416. This input device typically has two degrees of freedom in two axes, a first axis (e.g., x) and a second axis (e.g., y), which allows the device to specify positions in a plane.

In accordance with the described embodiments, also coupled to bus 402 is a graphics subsystem 418. Processor 404 provides graphics subsystem 418 with graphics data such as drawing commands, coordinate vertex data, and other data related to an object's geometric position, color, and surface parameters. In general, graphics subsystem 418 processes the graphical data, converts the graphical data into a screen coordinate system, generates pixel data (e.g., color, depth, texture) based on the primitives (e.g., points, lines, polygons, and meshes), and performs blending, anti-aliasing, and other functions. The resulting data are stored in a frame buffer 420. A display subsystem (not specifically shown) reads the frame buffer and displays the image on display device 416.

System 400 can be embodied as any type of computer system in which graphics rendering is to take place. In some embodiments, system 400 can be embodied as a game system in which 3D graphics rendering is to take place. As will become apparent below, the inventive embodiments can provide more realistic 3D rendering in a real time manner that is particularly well suited for the dynamic environments in which game system are typically employed.

Exemplary Embodiment Overview

In the embodiments described below, a solution to the transparent depth sorting problem is provided. In accordance with the described embodiments, multiple depth buffers are employed to support a sorting process that is directed to incorporating the transparency effects of any intervening transparent pixels on an associated opaque pixel that lies behind it.

In accordance with the described techniques, after all of the opaque pixels are rendered to, for example, a rendering surface, the sorting process looks to identify, for an associated opaque pixel, the closest transparent pixel that would overlie it or, from a viewer's perspective, be in front of it. When the sorting process finds the closest transparent pixel, the rasterization pipeline processes the pixel data associated with the opaque pixel to take into account the effect that the closest transparent pixel has on the opaque pixel. This typically results in the color values for the pixel of interest being modified. Once the color values are modified, the color values are written to the frame buffer for the pixel of interest. The sorting process then looks to identify the next closest transparent pixel and, if one is found, the rasterization pipeline processes the pixel data associated with the current pixel of interest to take into account the effect that the next closest transparent pixel has on the current pixel. Again, this typically results in the color values for the pixel of interest being modified. Once the color values are modified, the modified color values are again written to the frame buffer for the pixel of interest. This sorting process continues until, for a given pixel, no additional overlying transparent pixels are found.

The result of this process is that the transparency effects of overlying pixels are taken into account, in back-to-front order, so that resultant pixels have associated color values that accurately represent what the pixel would look like.

Using Multiple Depth Buffers to Effect Transparent Depth Sorting

In the example about to be described, multiple depth buffers are utilized to effect transparent depth sorting. In this specific example, the depth buffers comprise z-buffers. It is to be appreciated that the techniques described herein can be employed in connection with w-buffers, 1/w buffers, 1/z buffers, or other depth buffer types without departing from the spirit and scope of the claimed subject matter. For example, in one embodiment an inverse w-buffer that is Huffman encoded for varying precision throughout the range of depth can be used.

In the example about to be described, two physical z-buffers are employed. The hardware in the graphics subsystem understands two pointers and parameters for the two physical z-buffers. In accordance with one embodiment, both of the z-buffers are readable, while only one of the z-buffers is writable. The z-buffer that is both readable and writable is referred to as the "destination buffer", while the readable only z-buffer is referred to as the "source buffer". Additionally, in the embodiment about to be described, support is provided for the graphics software to be able to flip which buffer is considered the source buffer and which buffer is considered the destination buffer. The ability to flip which buffers are considered as the source and destination buffers effectively provides for a logical-to-physical mapping of the source and destination buffers to the actual physical buffers, as will be appreciated by the skilled artisan. In one embodiment, flipping the buffers is accomplished utilizing a multiplexer as input to the buffers address generation function. To flip the buffers, the multiplexer select signal is flipped.

Figure 5:
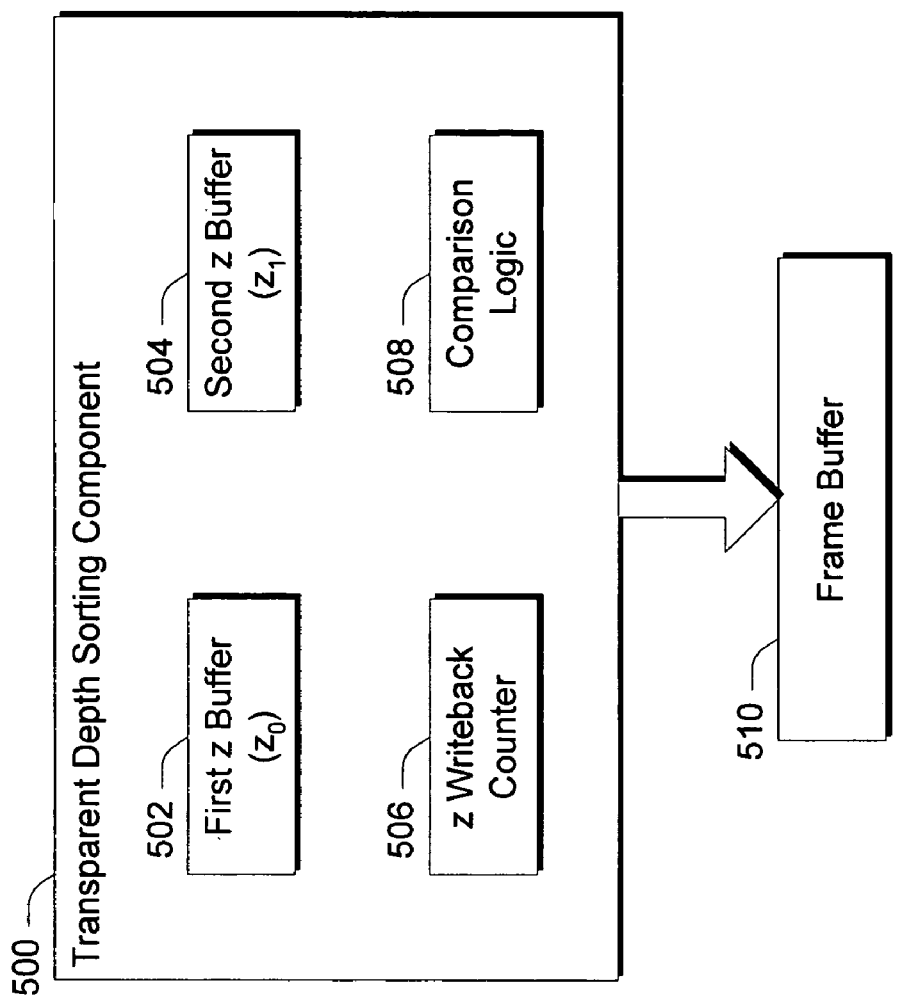
FIG. 5 is a block diagram that illustrates a transparent depth sorting component in accordance with one embodiment.

FIG. 5 shows a transparent depth sorting component 500 in accordance with one embodiment. This component can reside at any suitable location within the graphics processing pipeline. In one embodiment, component 500 can reside in the graphics subsystem, such as subsystem 418 in FIG. 4. Additionally, while the individual components of the transparent depth sorting component 500 are shown to reside inside the component, such is not intended to constitute a physical limitation on the arrangement and location of components. Rather, the transparent depth sorting component can constitute a logical arrangement of components. Accordingly, individual constituent parts of the transparent depth sorting component 500 may not necessarily reside physically inside the component 500.

As illustrated, component 500 comprises or makes use of a first z buffer 502 (designated $Z_0$), a second z buffer 504 (designated $Z_1$), a z writeback counter 506 and comparison logic 508. A frame buffer 510 is provided and can be written to as a result of the processing that is undertaken by transparent depth sorting component 500, as will become apparent below.

FIG. 6 is a flow diagram that describes steps in a transparent depth sorting method in accordance with one embodiment. The method can be implemented in connection with any suitable hardware, software, firmware or combination thereof. In one embodiment, the method can be implemented using a transparent depth sorting component such as the one illustrated and described in FIG. 5. Alternately or additionally, the method about to be described can be implemented using various components within a graphics subsystem, such as the one shown and described in FIG. 4.

In the method about to be described, two physical z-buffers are employed—a first one designated $z_0$ and a second one designated $z_1$. In the FIG. 6 flow diagram, the contents in the individual buffers at various points in the described process will be indicated, just to the right of the flow diagram, underneath columns designated "$z_0$" and "$z_1$" which are grouped underneath encircled numbers which indicate a particular pass in the process. So, for example, the first pass in the process is designated by an encircled "1", the second pass in the process is designated by an encircled "2" and so on. This is intended to help the reader follow along the described process. Also notice just beneath the columns designated "$z_0$" and "$z_1$" appears an example that shows, from a viewer's perspective, four different pixels that lie along a particular ray. In this example, pixel A is an opaque pixel, and pixels B, C, and D constitute transparent pixels (in reverse order of their closeness to the viewer) which form the basis of the example that is utilized to explain this embodiment. In this particular example, the depth values of the pixels increase the further away from the viewer that they appear. Thus, the depth value for pixel A is larger than the depth value for pixel B, and so on.

In addition, recall that the notion of a "destination buffer" and a "source buffer" was introduced above. The destination buffer is a buffer that is both readable and writable, while the source buffer is a buffer that is only readable. In the explanation that follows, the physical z buffers that are designated as the destination and source buffers will change. To assist in keeping track of these changes, a parenthetical "dest" and "src" will appear in the column associated with the physical buffer that bears the associated designation.

Step 600 maps first z buffer $z_0$ as the destination z-buffer and step 602 renders all of the opaque objects. The mapping of the first z buffer operates to designate the second z buffer $z_1$ as the source z buffer. Rendering the opaque objects involves finding the opaque pixels that are the closest opaque pixels to the viewer. Thus, rendering all of the opaque objects effectively obscures individual pixels that lie behind the closest opaque pixel. When objects or pixels are rendered, what is meant is that a series of primitives that represent the objects are drawn. In some embodiments, this means that the whole series of triangles that represent the objects are drawn.

When the opaque objects are rendered, individual color values for the opaque objects are written to the frame buffer and their corresponding depth values are written to the first z buffer $z_0$. Thus, in this example, for the illustrated ray, steps 600 and 602 result in the depth value for pixel A being written to the first z buffer $z_0$. At this point, the first z-buffer holds all of the depth data for all of the opaque pixels associated with the rendering surface.

What the algorithm will now attempt to do, for a ray that is cast for a particular x, y coordinate for the frame buffer, is find the transparent pixel contribution that is as close as possible in depth and closer to the viewer than the opaque pixel.

Accordingly, step 604 maps second z buffer $z_1$ as the destination z buffer which effectively flips the logical mapping of the buffers, and steps 606 and 608 respectively clear the destination z buffer and initialize the destination z buffer to a predetermined value. In this example, the predetermined value comprises its smallest value. The smallest value in this example is the value associated with the closest depth to the viewer—which is typically referred to as the "hither plane".

Step 610 clears a "z writeback counter" (e.g. component 506 in FIG. 5), which is utilized to keep track of writebacks that occur to the destination z buffer. Step 612 sets the z compare logic to not write to the frame buffer, but to write to the destination z buffer if a new z value is greater than the value in the destination z buffer (i.e. the hither plane value) and the new z value is less than the value in the source buffer (i.e. the depth value of pixel A). This step is directed to set up the logic to ascertain the depth value of the transparent pixel that is closest and in front of the opaque pixel. In this particular example, the result of performing step 614, which renders all of the transparent objects, is that the depth value associated with pixel B is written into the destination buffer which, in this example, is the second z buffer $z_1$.

In the first pass the z buffer value is obtained. In the second pass (described below), the color value for the z buffer level found in the first pass is obtained, and the frame buffer is written to. This step involves drawing the series of primitives that are associated with the transparent objects. Step 616 ascertains whether the z writeback counter is equal to 0. If the z writeback counter is equal to 0, meaning that no z writebacks occurred, then the method terminates or exits. Effectively, exiting this process means that all of the transparency effects for the rendering surface have been computed, back-to-front. In this particular single pixel example, since a z writeback occurred to account for the depth value of pixel B, the process does not exit.

Step 618 maps $z_0$ as the destination z buffer which effectively flips the logical mapping of the z buffers. Step 620 sets the z compare logic to write to the frame buffer (i.e. rendering surface) and the z buffer if the new z value is equal to the value in the source z buffer (i.e. the value associated with pixel B) and the new z value is less than the value in the destination z buffer (i.e. the depth value of pixel A). Here, since the new z value is the value associated with pixel B, both conditions are true, the frame buffer and the z buffer will be written to. Step 622 then renders all of the transparent objects, during which the value associated with pixel B is written into the destination z buffer.

Accordingly, in the first pass, the process has found the backmost transparent pixel (i.e. pixel B) and has written color values associated with the transparency effects of pixel B out to the frame buffer. This provides, in the first pass, a transparency effect that incorporates the contributions from pixel A and B. In the pass about to be described, the transparency effects of pixel next closest to pixel B (i.e. pixel C) will be computed. Following that pass, the transparency of the next closest pixel (i.e. pixel D) will be computed.

Accordingly, step 622 returns to step 604 and maps second z buffer $z_1$ as the destination z buffer which effectively flips the logical mapping of the buffers, and steps 606 and 608 respectively clear the destination z buffer and initializes the destination z buffer to its smallest value—i.e. the hither value. Step 610 clears the z writeback counter and step 612 sets the z compare logic to not write to the frame buffer, but to write to the destination z buffer if a new z value is greater than the value in the destination z buffer (i.e. the hither plane value) and the new z value is less than the value in the source buffer (i.e. the depth value of pixel B). This step is directed to set up the logic to ascertain the closest transparent pixel to pixel B which is also in front of pixel B. In this particular example, the result of performing step 614, which renders all of the transparent objects, is that the depth value associated with pixel C is written into the destination buffer which, in this example, is the second z buffer $z_1$.

Step 616 ascertains whether the z writeback counter is equal to 0. If the z writeback counter is equal to 0, meaning that no z writebacks occurred, then the method exits. Effectively, exiting this process means that all of the transparency effects for the rendering surface have been computed, back-to-front. In this particular single pixel example, since a z writeback occurred to account for the depth value of pixel C, the process does not exit.

Step 618 maps $z_0$ as the destination z buffer which effectively flips the logical mapping of the z buffers. Step 620 sets the z compare logic to write to the frame buffer (i.e. rendering surface) and the z buffer if the new z value is equal to the value in the source z buffer (i.e. the value associated with pixel C) and the new z value is less than the value in the destination z buffer (i.e. the depth value of pixel B). Here, since the new z value is the value associated with pixel C, both conditions are true, the frame buffer and the z buffer will be written to. Step 622 then renders all of the transparent objects during which the value associated with pixel C is written into the destination z buffer. At this point in the process, the transparency effects due to pixel C have been accounted for in the rendering surface.

The method then returns to step 604 and maps second z buffer $z_1$ as the destination z buffer which effectively flips the logical mapping of the buffers, and steps 606 and 608 respectively clear the destination z buffer and initializes the destination z buffer to its smallest value—i.e. the hither value. Step 610 clears the z writeback counter and step 612 sets the z compare logic to not write to the frame buffer, but to write to the destination z buffer if a new z value is greater than the value in the destination z buffer (i.e. the hither plane value) and the new z value is less than the value in the source buffer (i.e. the depth value of pixel C). This step is directed to set up the logic to ascertain the next closest transparent pixel to pixel C that lies between pixel C and the viewer. In this particular example, the result of performing step 614, which renders all of the transparent objects, is that the depth value associated with pixel D is written into the destination buffer which, in this example, is the second z buffer $z_1$.

Step 616 ascertains whether the z writeback counter is equal to 0. If the z writeback counter is equal to 0, meaning that no z writebacks occurred, then the method exits. Effectively, exiting this process means that all of the transparency I effects for the rendering surface have been computed, back-to-front. In this particular single pixel example, since a z writeback occurred to account for the depth value of pixel D, the process does not exit.

Step 618 maps $z_0$ as the destination z buffer which effectively flips the logical mapping of the z buffers. Step 620 sets the z compare logic to write to the frame buffer (i.e. rendering surface) and the z buffer if the new z value is equal to the value in the source z buffer (i.e. the value associated with pixel D) and the new z value is less than the value in the destination z buffer (i.e. the depth value of pixel C). Here, since the new z value is the value associated with pixel D, both conditions are true, the frame buffer and the z buffer will be written to. Step 622 then renders all of the transparent objects, during which the value associated with pixel D is written into the destination z buffer. At this point in the process, the transparency effects due to pixel D have been accounted for in the rendering surface. The method then returns to step 604.

Without going through the flow diagram again, with the depth value for pixel D residing in the source z buffer due to the buffer flipping of step 604, the flow diagram will effectively, at step 616, exit the process as the z writeback counter will equal 0.

Thus, what has occurred at this point is that the individual transparent pixels have been depth sorted, back-to-front, and their individual effects on given pixels have been taken into account in a realistic manner. That is, the process described above effectively sorts the z values of individual pixels to find the depth of the transparent pixel that is furthest away from the viewer and closest to an associated opaque pixel that the transparent pixel affects. The transparency effects of this furthest most transparent pixel are computed and written to the frame buffer. Then, the process repeats itself and looks for the transparent pixel that is the next furthest most pixel away from the viewer and closest to the last transparent pixel. If found, the transparency effects of the next furthest most transparent pixel is computed and written to the frame buffer. This process continues until there are no more transparent pixels along an associated ray. Thus, the transparency effects of individual transparent pixels that lie along a particular ray are taken into account in a back-to-front manner which provides realistic, real time computer graphics rendering.

Conclusion

The methods and systems described above can provide solutions to the transparent depth sorting process that can result in more realistic 3D graphics rendering, particularly in scenarios in which real time rendering is appropriate.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
   sorting, using multiple depth buffers, depth data associated with multiple transparent pixels that overlie one another to identify an individual pixel that lies closest to an associated opaque pixel;

computing a transparency effect of the identified pixel relative to the associated opaque pixel; and after said computing, identifying a next closest transparent pixel relative to the opaque pixel and computing, for the next closest pixel, a transparency effect relative to the transparency effect that was just computed; and wherein said sorting comprises flipping which of the multiple buffers is considered as a destination buffer and a source buffer.

2. The method of claim 1, wherein said multiple depth buffers comprise z buffers.

3. The method of claim 1, wherein said multiple depth buffers comprise w buffers.

4. The method of claim 1, wherein said multiple dept buffers comprise 1/w buffers.

5. The method of claim 1, wherein said multiple depth buffers comprise 1/z buffers.

6. The method of claim 1, wherein said act of sorting comprises:
identifying the destination buffer as both readable and writable; and
identifying the source buffer as only readable.

7. The method of claim 1 further comprising repeating said act of identifying for any additional overlying transparent pixels.

8. A computing system configured to implement the method of claim 1.

9. An apparatus comprising:
means for sorting, using multiple depth buffers, depth data associated with multiple transparent pixels that overlie one another to identify an individual pixel that lies closest to an associated opaque pixel;
means for computing a transparency effect of the identified pixel relative to the associated opaque pixel; and
means for identifying a next closest transparent pixel relative to the opaque pixel and computing, for the next closest pixel, a transparency effect relative to the transparency effect that was just computed; and
wherein said means for storing comprises means for flipping which of the multiple buffers is considered as a destination buffer and a source buffer.

10. The apparatus of claim 9, wherein said means for sorting and means for identifying comprises hardware comparison logic.

11. A method comprising:
(a) rendering at least one opaque pixel that lies along a ray;
(b) identifying a transparent pixel that lies along the ray, the identified transparent pixel being the closest transparent pixel to the opaque pixel;
(c) computing transparency effects of the identified transparent pixel relative to the opaque pixel;
(d) if additional transparent pixels lie along the ray, identifying a next closest transparent pixel relative to the opaque pixel and computing transparency effects of the next closest pixel relative to the computed transparency effects of a last computed transparent pixel; and
(e) repeating act (d) until transparency effects of all of the transparent pixels along the ray have been computed in a back-to-front manner;
(f) wherein acts (a)–(e) are performed utilizing two physical depth buffers for sorting depth data associated with the transparent pixels, and wherein the two depth buffers are configured to be flipped.

12. The method of claim 11, wherein the physical depth buffers comprise z buffers.

13. The method of claim 11, wherein the physical depth buffers comprise w buffers.

14. The method of claim 11, wherein the physical buffers comprise 1/w buffers.

15. The method of claim 11, wherein the physical buffers comprise 1/z buffers.

16. The method of claim 11, wherein performing acts (a)–(e) comprise:
designating one of the depth buffers as readable and writable;
designating the other of the depth buffers as readable only; and
flipping the designations of the depth buffers.

17. The method of claim 11, wherein the two physical depth buffers comprise z buffers and performing acts (a)–(e) comprise:
designating one of the z buffers as readable and writable;
designating the other of the z buffers as readable only; and
flipping the designations of the z buffers.

18. The method of claim 11, wherein the two physical depth buffers comprise w buffers and performing acts (a)–(e) comprise:
designating one of the w buffers as readable and writable;
designating the other of the w buffers as readable only; and
flipping the designations of the w buffers.

19. The method of claim 11, wherein the two physical depth buffers comprise 1/w buffers and performing ads (a)–(e) comprise:
designating one of the 1/w buffers as readable and writable;
designating the other of the 1/w buffers as readable only; and
flipping the designations of the 1/w buffers.

20. The method of claim 11, wherein the two physical depth buffers comprise 1/z buffers and performing acts (a)–(e) comprise:
designating one of the 1/z buffers as readable and writable;
designating the other of the 1/z buffers as readable only; and
flipping the designations of the 1/z buffers.

21. A computing system configured to implement the method of claim 11.

22. A system comprising:
means for rendering at least one opaque pixel that lies along a ray;
means for identifying a transparent pixel that lies along the ray, the identified transparent pixel being the closest transparent pixel to the opaque pixel;
means for computing transparency effects of the identified transparent pixel relative to the opaque pixel; and
means for identifying, in a back-to-front manner, additional transparent pixels and successively computing transparency effects for the additional transparent pixels, wherein said means for identifying comprises a pair of physical depth buffers that can be logically flipped.

23. The system of claim 22, wherein said means for rendering comprises a graphics subsystem.

24. A system comprising:
a transparent depth sorting component comprising:
at least two physical depth buffers;

a writeback counter to count writebacks that occur to at least one of the two physical depth buffers; and comparison logic that is configured to effect:

sorting, using said at least two physical buffers, of depth data associated with multiple transparent pixels that overlie one another to identify an individual pixel that lies closest to an associated opaque pixel;

computing a transparency effect of the identified pixel relative to the associated opaque pixel;

after said computing, identifying a next closest transparent pixel relative to the opaque pixel; and computing, for the next closest pixel, a transparency effect relative to the transparency effect that was computed for the said closest individual pixel and the associated opaque pixel.

25. The system of claim 24, wherein:

one of said at least two physical dept buffers is capable of being designated as readable and writable;

another of said at least two physical depth buffers is capable of being designated as readable only; and designations of said at least two physical depth buffers are capable of being flipped.

26. The system of claim 24, wherein said at least two physical depth buffers comprise z buffers.

27. The system of claim 24, wherein said at least two physical depth buffers comprise w buffers.

28. The system of claim 24, wherein said at least two physical depth buffers comprise 1/w buffers.

29. The system of claim 24, wherein said at least two physical depth buffers comprise 1/z buffers.

30. The system of claim 24, wherein said transparent depth sorting component is configured to terminate transparent depth sorting when the writeback counter indicates that no writebacks have occurred.

31. A graphics subsystem embodying the transparent depth sorting component of claim 24.

32. A computer system embodying the graphics subsystem of claim 31.

33. A method comprising:

mapping a first of two depth buffers as a destination buffer that is readable and writable, a second of the two depth buffers being designated as a source buffer that is only readable;

rendering one or more opaque objects having associated opaque pixels;

writing a depth value associated with an opaque pixel to the first buffer;

mapping the second of the depth buffers as the destination buffer, the first of the depth buffers being designated as the source buffer;

initializing the destination buffer to a predetermined value;

effecting a comparison of a new pixel depth value with values in the source and destination buffers and writing the new pixel depth value to the destination buffer if the new pixel depth value is (a) greater than the value currently in the destination buffer and (b) less than the value in the source buffer, effective to write a new pixel depth value that is associated with a pixel that is closest to a pixel whose depth value is contained in the source buffer;

rendering one or more transparent objects having associated transparent pixels;

determining if transparency effects for all transparent pixels in all transparent objects have been accounted for and if so, terminating processing and, if not:

mapping the first of the depth buffers as the destination buffer, the second of the buffers being designated as the source buffer;

effecting a comparison of The new pixel depth value with values in the source and destination buffers and writing to a frame buffer and the destination buffer if the new pixel depth value is equal to the value in the source buffer and the new pixel depth value is less than the value in the destination buffer;

rendering one or more transparent objects; and returning to said act of mapping the second of the depth buffers until transparency effects of all transparent pixels in all the transparent objects have been accounted for.

34. The method of claim 33, wherein said predetermined value comprises a depth buffer's smallest value.

35. The method of claim 33, wherein said act of determining is performed by maintaining a depth buffer writeback counter that keeps track of depth buffer writebacks.

36. The method of claim 33, wherein the depth buffers comprise z buffers.

37. The method of claim 33, wherein the depth buffers comprise w buffers.

38. The method of claim 33, wherein the depth buffers comprise 1/w buffers.

39. The method of claim 33, wherein the depth buffers comprise 1/z buffers.

40. A computing system configured to implement the method of claim 33.

41. A system comprising:

a processor;

at least two depth buffers;

a frame buffer; and a graphics subsystem operably connected with the processor and configured to, under the influence of the processor:

map a first of the depth buffers as a destination buffer that is readable and writable, a second of the depth buffers being designated as a source buffer that is only readable;

render one or mare opaque objects baying associated opaque pixels;

write a depth value associated with an opaque pixel to the first buffer;

map the second of the depth buffers as the destination buffer, the first of the depth buffers being designated as the source buffer;

initialize the destination buffer to a predetermined value;

effect a comparison of a new pixel depth value with values in the source and destination buffers and write the new pixel depth value to the destination buffer if the new pixel depth value is (a) greater than the value currently in the destination buffer and (b) less than the value in the source buffer, effective to write a new pixel depth value that is associated with a pixel that is closest to a pixel whose depth value is contained in the source buffer;

render one or mare transparent objects having associated transparent pixels;

determine if transparency effects for all transparent pixels in all the transparent objects have been accounted for and if so, terminate processing and, if not:
  map the first of the depth buffers as the destination buffer, the second of the buffers being designated as the source buffer;
  effect a comparison of the new pixel depth value with values in the source and destination buffers and write to the frame buffer and the destination buffer if the new pixel depth value is equal to the value in the source buffer and the new pixel depth value is less than the value in the destination buffer;
render one or more transparent objects; and
return to said mapping the second of the depth buffers until transparency effects of all transparent pixels in all the transparent objects have been accounted for.

42. The system of claim 41, wherein said predetermined value comprises a depth buffer's smallest value.

43. The system of claim 41 further comprising a depth buffer writeback counter that keeps track of depth buffer writebacks.

44. The system of claim 41, wherein the depth buffers comprise z buffers.

* * * * *